US012449949B2

(12) United States Patent
Bendall

(10) Patent No.: US 12,449,949 B2
(45) Date of Patent: *Oct. 21, 2025

(54) INTERACTIVE MEASUREMENT BASED ON THREE-DIMENSIONAL REPRESENTATIONS OF OBJECTS

(71) Applicant: Baker Hughes Holdings LLC, Houston, TX (US)

(72) Inventor: Clark A. Bendall, Skaneateles, NY (US)

(73) Assignee: Baker Hughes Holdings LLC, Houston, TX (US)

( * ) Notice: Subject to any disclaimer, the term of this patent is extended or adjusted under 35 U.S.C. 154(b) by 39 days.

This patent is subject to a terminal disclaimer.

(21) Appl. No.: 18/609,583

(22) Filed: Mar. 19, 2024

(65) Prior Publication Data

US 2024/0220070 A1 Jul. 4, 2024

Related U.S. Application Data

(63) Continuation of application No. 18/131,456, filed on Apr. 6, 2023, now Pat. No. 12,014,022.

(Continued)

(51) Int. Cl.
*G06F 3/04815* (2022.01)
*G06T 7/00* (2017.01)
(Continued)

(52) U.S. Cl.
CPC .......... *G06F 3/04815* (2013.01); *G06T 7/001* (2013.01); *G06T 7/60* (2013.01);
(Continued)

(58) Field of Classification Search
CPC .. G06T 7/001; G06T 7/60; G06T 7/62; G06T 7/64; G06T 7/66; G06T 7/68; G06T 7/74;
(Continued)

(56) References Cited

U.S. PATENT DOCUMENTS

2005/0195157 A1* 9/2005 Kramer ................... G06T 11/60
345/156
2007/0046661 A1* 3/2007 Ma ........................ G06T 19/003
345/619

(Continued)

*Primary Examiner* — Daniel Samwel
(74) *Attorney, Agent, or Firm* — Mintz, Levin, Cohn, Ferris, Glovsky and Popeo, P.C.

(57) ABSTRACT

A method, a system, and computer program product for rendering a visual representation of a target object using a selection of a first position on the surface of the target object. A reference surface is determined based on selected positions on the surface of the target object. A graphical object overlaying the visual representation of the target object is rendered. A location of the graphical object in the graphical user interface is based on the reference surface. The graphical object has a perimeter including the perimeter positions. A perimeter position of the perimeter positions is mapped to a second point on a three-dimensional representation of the target object. A distance between a first point and a second point on the three-dimensional representation of the target object is less than or equal to a second distance. The first point on the three-dimensional representation is associated with the first position.

23 Claims, 16 Drawing Sheets

Related U.S. Application Data

(60) Provisional application No. 63/341,696, filed on May 13, 2022.

(51) Int. Cl.
*G06T 7/60* (2017.01)
*G06T 7/73* (2017.01)
*G06T 19/00* (2011.01)

(52) U.S. Cl.
CPC ............... *G06T 7/74* (2017.01); *G06T 19/00* (2013.01); *G06T 2200/24* (2013.01); *G06T 2207/10012* (2013.01); *G06T 2207/10028* (2013.01); *G06T 2207/20101* (2013.01); *G06T 2207/30108* (2013.01); *G06T 2210/56* (2013.01)

(58) Field of Classification Search
CPC ....... G06T 19/00; G06T 19/003; G06T 19/20; G06T 2200/24; G06T 2207/10012; G06T 2207/10028; G06T 2207/20101; G06T 2207/30108; G06T 2210/56
See application file for complete search history.

(56) References Cited

U.S. PATENT DOCUMENTS

| | | | |
|---|---|---|---|
| 2013/0227493 A1* | 8/2013 | Schmidt | G06F 3/04815 715/849 |
| 2017/0016719 A1* | 1/2017 | Delfino | G01B 21/00 |
| 2018/0075618 A1* | 3/2018 | Lai | H04N 13/275 |
| 2020/0043226 A1* | 2/2020 | Abe | G01B 11/24 |
| 2020/0387041 A1* | 12/2020 | Shrivastava | G02F 1/161 |

* cited by examiner

INTERACTIVE MEASUREMENT BASED ON THREE-DIMENSIONAL REPRESENTATIONS OF OBJECTS

RELATED APPLICATION

This application is a continuation of U.S. patent application Ser. No. 18/131,456 filed on Apr. 6, 2023, entitled "Interactive Measurement Based on Three-Dimensional Representations of Objects," and claims the benefit of U.S. Provisional Patent Application No. 63/341,696 filed on May 13, 2022, entitled "Interactive Measurement Based on Three-Dimensional Representations of Objects," the entire contents of each of which are hereby expressly incorporated by reference herein.

FIELD

The present application relates to systems and methods for interactive measurement based on three-dimensional representations of objects.

BACKGROUND

Three-dimensional objects (e.g., surfaces) can be imaged and presented in a graphical user interface (GUI). For example, a two-dimensional image (e.g., a picture) of the object can be presented in the GUI. Alternately, a three-dimensional image (e.g., a point cloud view) of the object can be presented in the GUI. A point cloud view can be generated by detecting multiple locations on the external surface of the object using a 3D image technique such as structured light projection, stereo, photogrammetry, time of flight, etc. In some implementations, multiple images of the external object can be combined to generate a portion of the three-dimensional image. Point clouds can be used to generate 3D computer-aided design (CAD) models of manufactured parts, for metrology, in animation, or other applications.

SUMMARY

In general, systems and methods are provided for interactive measurement of three-dimensional representations of objects detected by monitoring devices. Various aspects of the disclosed subject matter may provide one or more of the following capabilities.

A method includes rendering, in a graphical user interface display space, a visual representation of a target object. The method can also include receiving, based on a first user interaction with the visual representation, a first user input indicative of selection of a first position on the surface of the target object. The method can further include determining a reference surface based on selection of a plurality of positions on the surface of the target object. The plurality of positions are located within a first distance from the first position on the surface of the target object. The method can also include rendering, in the graphical user interface, a graphical object overlaying the visual representation of the target object. A location of the graphical object in the graphical user interface is based on the determined reference surface. The graphical object has a perimeter including a plurality of perimeter positions. A perimeter position of the plurality of perimeter positions is mapped to a second point in the three-dimensional coordinate system of a three-dimensional representation of the target object. Distance between a first point and a second point in the three-dimensional coordinate system is less than or equal to a second distance. The first point in the three-dimensional coordinate system is associated with the first position.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

When practical, similar reference numbers denote similar structures, features, or elements.

DETAILED DESCRIPTION

The present application relates to interactive measurement of three-dimensional representations of target objects. A target object (e.g., an industrial machine) can be imaged, by a monitoring device, and the imaged data can be presented to a user for inspection in a graphical user interface (GUI) of an inspection system. For example, the user can inspect the industrial machine and identify any damage or likelihood of damage during the course of operation of the industrial machine. The imaged data can be presented as a two-dimensional (2D) image and/or a three-dimensional (3D) image of the target object. The images can be displayed in an interactive setting. For example, the interactive setting can enable generation of a graphical object that overlays the 2D/3D image of the target object. The graphical object can allow for improved inspection of the industrial machine. For example, the interactive setting can enable a comparison of the features of the industrial machine to the features of the graphical object while inspecting the target object industrial machine.

In some implementations, the imaged data can be used to construct a three-dimensional (3D) representation of the target object. The 3D representation can allow for mapping of positions (or pixels) in the 2D image to a point (e.g., x, y, z coordinate) in a 3D image. The graphical object generated in a 2D image (e.g., defined by a plurality of positions (or pixels) in the 2D image) can be mapped to a plurality of points in the 3D representations of the target object or to the surface thereof (e.g., each position in the 2D image can map to a point in the 3D representation of the surface of the target object). In some implementations, a circle in the 3D representation can be mapped to an oval region in the 2D image (e.g., based on the perspective of the camera used to capture the 2D image). In some implementations, the interactive setting can generate a recommendation of an action based on a characterization (including a defect detection) of the mapping of the target object. The action can be automatically triggered to be performed by the monitoring device or a repairing device to remedy the detected defect of the target object.

Figure 1:
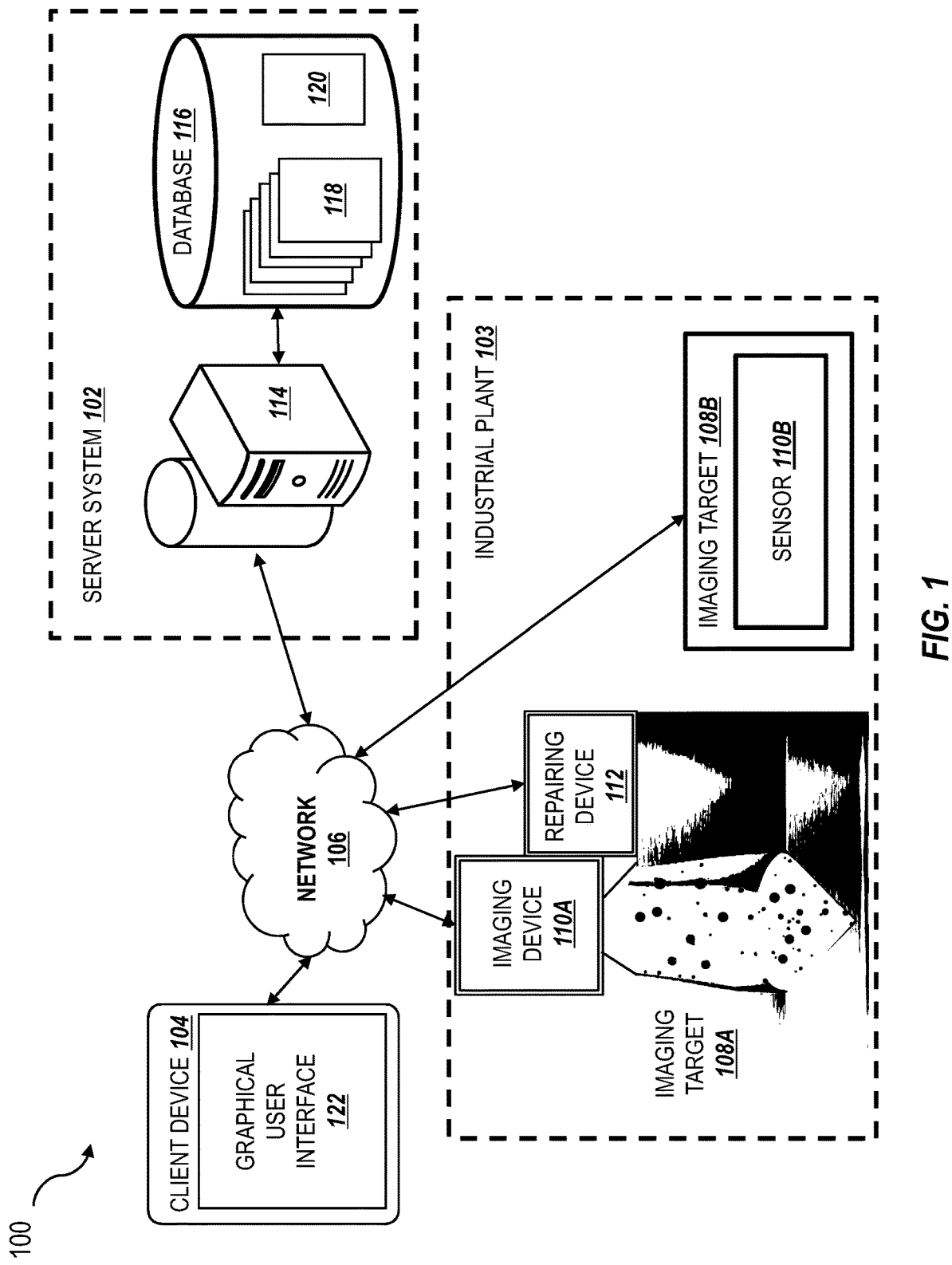
FIG. 1 illustrates an example of a system, in accordance with embodiments presented herein.

By way of introduction, FIG. 1 depicts a diagram illustrating an example of a system 100, in accordance with some example embodiments. The system 100 illustrated in FIG. 1 includes a server system 102, an industrial plant 103, a client device 104, and a network 106. The industrial plant 103 can include one or more imaging targets 108A, 108B, an imaging device 110A, a sensor 110B, and a repairing device 112. The imaging targets 108A, 108B can include industrial machines that can be operationally coupled to each other.

The server system 102 may be communicatively coupled, via the network 106, with the components (e.g., the imaging targets 108A, 108B, the imaging device 110A, the sensor 110B, and the repairing device 112) of the industrial plant 103 and a plurality of clients including, for example, a client device 104, and/or the like. The server system 102 can be configured to receive, from the imaging devices 110A and/or the inspection device 110B, data (e.g., images, detected data, and metadata) associated with the imaging targets 108A, 108B.

The server system 102 includes a characterization engine 114 and a database 116. The characterization engine 114 can be configured as a server device intended to represent various forms of servers including, but not limited to a web server, an application server, a proxy server, a network server, and/or a server pool. In general, the characterization engine 114 accepts requests for image processing services, such as for detection and characterization of defects of imaging targets 108A, 108B (e.g., pipes, pipeline networks, and/or machines), and provides such services to any number of devices (e.g., the imaging device(s) 110A, repairing device(s) 112 and client devices(s) 104) over the network 106. The characterization engine 114 can be running instances of the corresponding executable codes (e.g., .exe files) included in a kernel of the database 116. The kernel of the database 116 can also include other executable codes (e.g., .exe files) configured for running the characterization engine 114 or other functions of the server system 102. In some implementations, an executable code can be a computer program that have already been compiled into machine language (e.g., binary code) and is therefore capable of being executed directly by a data processor. The characterization engine 114 is communicatively coupled with the database 116.

The database 116 can be any type of database including, for example, a relational database, a non-structured query language (NoSQL) database, an in-memory database, a graph database, a cloud database system environment, and/or the like. The database 116 can store a local library that can include documents 118 and a learning model 120 that can be used by the characterization engine 114 for detecting and characterizing defects of imaging targets 108A, 108B. The documents 118 can include training documents (e.g., past repairing decisions associated with past recommendations of detected defects), executable files (e.g., executable files used by image processing applications and defect characterization applications for automatic detection and characterization of defects in imaging targets 108A, 108B), and recommendation setting files (e.g., including threshold parameters for automatic characterization of defects). The documents 118 can be stored by the database 116 as a multidimensional file, such as an excel file. The excel file can allow users to edit the document 118, such as modify dimensions (rows and/or columns within a single or multiple tabs), add items to one or more dimensions of the document 118, and/or modify data type within particular dimensions of the document 118. The document 118 can include any type of electronic document including structured data, for example, in the form of key value pairs. The key in a key value pair can be a string value identifying a corresponding value (e.g., threshold parameter value for automatic characterization of defects).

In some example embodiments, the learning model 120 may be stored in tables that may be expanded dynamically to include additional objects (defect classifications) when the client device 104 creates defect related events having objects that are not already a part of the learning model 120. For example, while the learning model 120 is described as including a first set of defect parameters (e.g., location, size, material gain/loss, shape), the characterization engine 114 may receive, from the client device 104, an indication to add, to defect characterization a new defect parameter (e.g., defect time progression). In response to the addition of the new defect parameter to the defect characterization, the characterization engine 114 may expand the one or more tables storing the learning model 120 to accommodate the defect characterization.

The client devices(s) 104 can be and/or include any type of processor and memory based device, such as, for example, cellular phones, smart phones, tablet computers, laptop computers, desktop computers, workstations, personal digital assistants (PDA), network appliances, cameras, enhanced general packet radio service (EGPRS) mobile phones, media players, navigation devices, email devices, game consoles, or an appropriate combination of any two or more of these devices or other data processing devices. The client device 104 can include any combination of fixed and variable computing components. Even though, not illustrated, in some implementations, multiple client devices 104 including different computing system configurations, such as different operating systems, different processing capabilities, different hardware components, and/or other differences can concurrently receive defect characterization results from the server system 102, including defect repair recommendations from the characterization engine 114. The client device 104 can be configured to display, on the graphical user interface (GUI) 122, visual representations of an imaging target (as described with reference to FIGS. 2-14) and the defect characterization results received from the server system 102. The GUI 122 can include an input interface, an output interface, and a communication interface. The GUI 122 can be configured to receive a user input associated with a displayed image of the imaging target (target object), such as via user input (e.g., a touchscreen display, a keyboard, a keypad, a mouse, a button, a switch, a microphone, a camera, and/or the like). In some examples, communication interface 122 permits the client device 104 to receive information from another device and/or provide information to another device. In some examples, communication interface 122 includes an Ethernet interface, an optical interface, a coaxial interface, an infrared interface, a radio frequency (RF) interface, a universal serial bus (USB) interface, a Wi-Fi® interface, a cellular network interface, and/or the like.

As shown in FIG. 1, the client device 104 can be communicatively coupled, via the network 106, with the server system 102 to enable monitoring of automatically performed defect characterization processes. The network 106 can be any wired and/or wireless network including, for example, a public land mobile network (PLMN), a local area network (LAN), a wide area network (WAN), the Internet, a cellular network, a telephone network (e.g., PSTN) or an appropriate combination thereof connecting any number of communication devices, mobile computing devices, fixed computing devices, server systems, and/or the like.

Within a context example, the imaging device 110A (inspection device) can be configured to scan a component (e.g., compressor blades) of the imaging targets 108A, 108B (e.g., compressors) according to a scanning plan (defining scanning settings, such as imaging position) that can be stored by the database 116. The imaging device 110A and/or the sensor 110B can include any device configured to generate images and other data (e.g., position data) using a non-destructive beam that can penetrate through the imaging target, up to a set depth and can record a response of the interaction of the beam with the imaging target, such as an x-ray imaging device, a computer tomography imaging device and any other type of imaging devices and sensors. The imaging device 110A and/or the sensor 110B can include cameras, LIDAR sensors, RADAR sensors, SONAR sensors, or other sensing devices. The imaging device 110A can transmit the acquired images to the characterization engine 114, which can automatically process the images of the scanned region of the imaging targets 108A, 108B according to the plan to detect any potentially existent defects. In some implementations, the imaging device 110A can adjust its position (e.g., in response to a user input) relative to a position of a portion (e.g., blade) of the imaging target 108A, 108B (e.g., compressor). The imaging device 110A can be integrated in the repairing device(s) 112 and/or coupled to the repairing device(s) 112 to enable performance of a characterization and repair process, as described with reference to FIG. 3. The characterization engine 114 can characterize the detected defects, using a defect characterization application including one or more machine learning algorithms for automatic characterization of defects in imaging targets 108A, 108B. The characterization engine 114 may generate a recommendation for the client device 104 to approve a repair of the detected defect characterized as critical that can be executed by the repairing device 112.

In some example embodiments, the characterization engine 114 may generate and/or update, based on feedback received from the client device 104, at least on one or more defect characterization parameters used by a learning model stored by the database 116. For example, in response to detecting initiation of a repair event for a detected defect automatically assigned to monitoring, the characterization engine 114 may update the learning model 120 to increment a critical level of defects including a combination of the detected defect parameters manually assigned to repair. Alternatively and/or additionally, in response to detecting replacement of a repair event with a monitoring event for a detected defect automatically assigned to a repair event, the characterization engine 114 may update the learning model 120 to decrease a critical level of defects including a combination of the detected defect parameters manually assigned to monitoring. As such, the characterization engine 114 may query the database 116 in order to update the learning model 120 and/or to apply the learning model to generate one or more recommendations to be displayed by the client device 104.

As noted, when the characterization engine 114 receives, from the client device 104, an indication to create a repair event, the characterization engine 114 may respond by at least applying the learning model 120 to generate a recommendation for the client device 104 to add, to the repair event, the imaging targets 108A, 108B. Accordingly, the characterization engine 114 may generate the recommendation to add the imaging targets 108A, 108B to the repair event based at least on the defect characterization of as defect detected in the imaging targets 108A, 108B. For example, the characterization engine 114 may generate the recommendation to add the imaging targets 108A, 108B to the repair event based at least on a defect parameter exceeding a critical threshold. Alternatively and/or additionally, the characterization engine 114 may generate the recommendation to add the imaging targets 108A, 108B to the repair event based at least on a combination of defect parameter exceeding respective critical threshold values. Further details of the processes that can be performed by the example system 100 are described with reference to FIG. 2.

Figure 2:
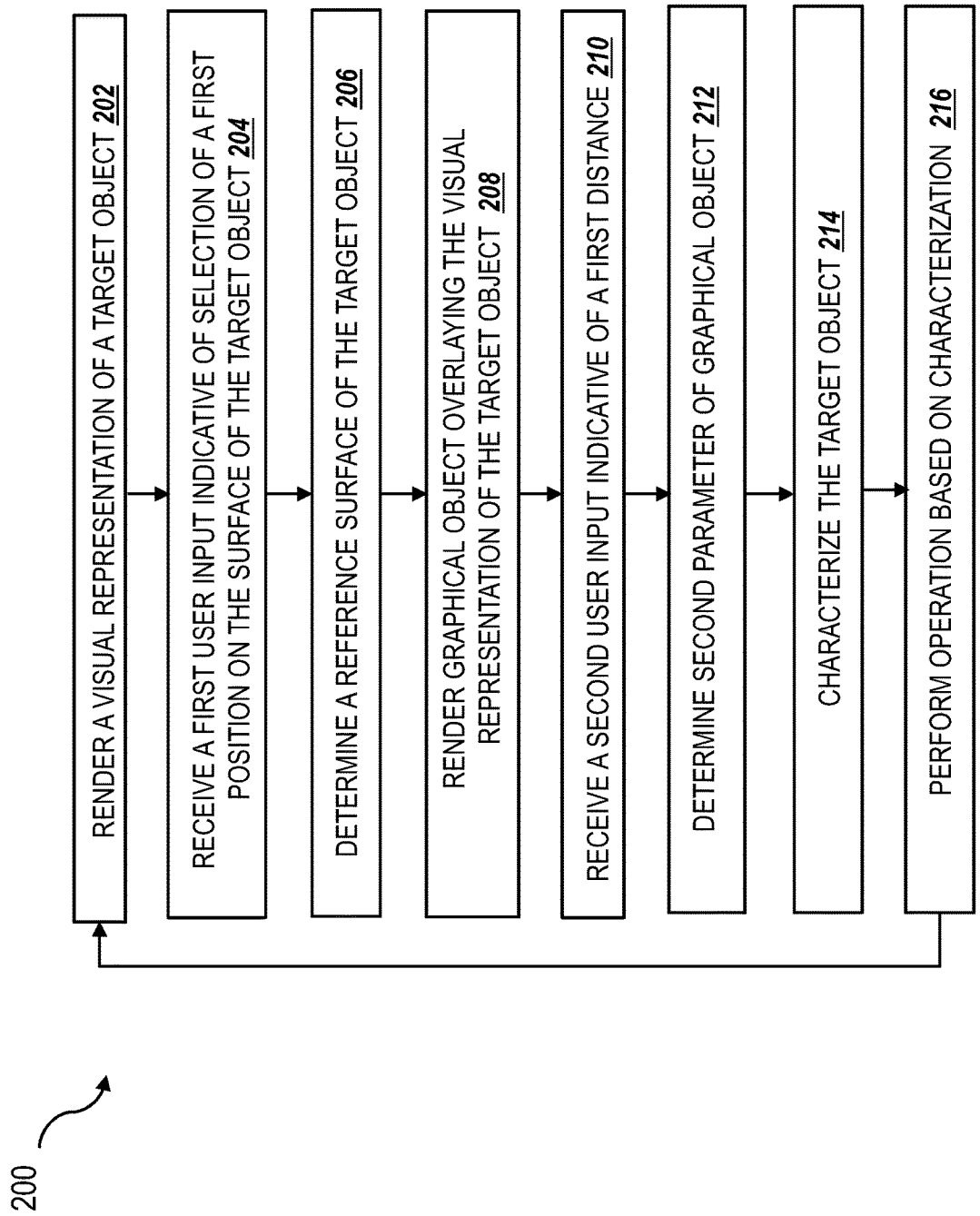
FIG. 2 is a flow chart of an example process, in accordance with embodiments presented herein.

Referring now to FIG. 2 is a flow chart of an example process 200 of rendering a graphical object overlaying a visual representation of a target object in a GUI. The example process 200 may be performed by the defect characterization system 100, described with reference to FIG. 1.

At 202, a visual representation of a portion of a target object can be rendered in a graphical user interface. The visual representation can include a 2D image of the target image, a 3D image of the target image (e.g., a portion of an industrial machine or industrial component), or both. The images can be received by a server system or a client device, from an imaging device configured to image at least a portion of the target object, according to an imaging plan. In some implementations, imaging plan can include a description of imaging type associated with an imaging target type. The imaging device can be configured to generate and transmit data characterizing a plurality of images (e.g., stereoscopic images) of the target object and, optionally, metadata associated with the images (e.g., imaging position relative to a reference point included in the imaging target or external to the imaging target). The visual representation can be generated by processing one or more images of the target object. The visual representation can include a point cloud image of the target object. The visual representation can include three-dimensional information of the target object surface (e.g., via a 3D representation of the surface of the target object). The 3D representation can be determined based on the plurality of images of the target object. The 3D representation includes a plurality of points on the surface of the target object.

At 204, a first user input indicative of selection of a first position on the surface of the target object can be received, by the client device. The first user input is based on a first user interaction with the visual representation (e.g., by the user clicking on the first position in the 2D image) within the GUI of the client device.

At 206, a reference surface can be determined in the 3D representation of the target object. In some implementations, the reference surface can be determined based on the selection of a plurality of positions that are located within a first distance from the first position on the surface of the target object. In some implementations, the first distance may be a distance in a 2D image (e.g. pixels). In some implementations, the first distance may be a distance in a 3D coordinate system (e.g. millimeters or inches). In some implementations, the first position can be mapped (or projected) to a first point in the 3D representation of the target object. A plurality of points in the 3D representation that are within the first distance (e.g., a predetermined radius) and lie on the surface of the target object can be automatically identified. The selected plurality of points map to the above-mentioned plurality of positions (e.g., in the 2D image). The plurality of points can be processed to determine the reference surface. For example, the points can be processed using a linear regression (e.g., fuzzy logic, neural networks, piecewise linear regression, polynomial fit, and other pattern recognition and plane estimation techniques) can be used to calculate an optimal fit plane for the plurality of points. In some implementations, the reference surface can be determined based on a selection of a plurality of positions on the surface of the target object. For example, at least a first position, a second position and a third position of the plurality of positions can be selected based on a second user input, a third user input and a fourth user input, respectively. The first, second and third positions can map to a first point, a second point and a third point, respectively. The reference surface including the first point, the second point and the third point can be determined (e.g., using linear regression) in the 3D representation of the target object.

At 208, a graphical object overlaying the visual representation of the target object can be rendered. The graphical object can be overlaid based on the determined reference surface. The graphical object can have a perimeter including a plurality of perimeter positions. Perimeter positions can be mapped to perimeter points in the 3D representation. For example, each perimeter position can be mapped to a particular point in the 3D representation. The distance between the first point (e.g., determined based on the first user input selecting the first location) and a second point on the three-dimensional representation of the target object can be less than or equal to a second distance (e.g., indicative of radius of the graphical object). In other words, the plurality of points on the surface of the target object can be defined in a 3D coordinate system and can be used to render the 3D representation. A 3D circle may be defined on the reference surface in the 3D coordinate system. The 3D circle may have a center point and a radius determined based on first and second user inputs. A graphical object representing the 3D circle may be overlaid on (e.g. drawn on top of or rendered as part of) the 3D representation. A graphical object representing the 3D circle may also be determined based on projecting one or more points on the perimeter of the 3D circle into the 2D image space based on the position and orientation of the camera used to capture the 2D image in the 3D coordinate system as well as its optical characteristics (e.g. field of view, optical distortion, pixel size, etc.). The graphical object overlaid on the 2D image and/or the 3D image may appear as a circular shape (e.g., a circle or an oval) depending on the viewing perspective of the camera relative to the reference surface. In some implementations, the graphical object overlaid on a 3D image may appear as a spherical shape (e.g., a sphere) depending on the viewing perspective of the camera relative to the reference surface.

In some implementations, the points can include a first point that can be the center of the graphical object displayed as a circle (which maps to the graphical object in the 2D image) in the 3D representation, and a second point that can be a point on the perimeter of the circle. In some implementations, both the first and the second points can be located on the perimeter of the circle such that the distance between the first and the second points is the diameter of the graphical object displayed as a circle, as described in FIG. 13.

At 210, a second user input indicative of the first distance can be received, by the client device. The second user input can include addition of a measurement plane and/or a value of a parameter (e.g., radius or diameter) of the graphical object (e.g., the circle) overlaid on the image of the target object. For example, the user input can include placement of 3 cursors on the target surface in the representation that can be used to determine a best-fit plane using a plurality of 3D points from the 3D representation proximate locations associated with the 3 cursor locations. In some implementations, the second input can be indicative of selection of a second position on the surface of the target object. The first distance (e.g., diameter of the circle) can be determined based on the distance between the first point (which is the mapping of the first location in the 3D representation) and a second point (which is the mapping of the second location in the 3D representation).

At 212, a second parameter of the graphical object (e.g., the circle) overlaid on the image of the target object can be determined by using the second user input. For example, the first point (which is the center of the circle) and the first parameter (e.g., radius or diameter) value can be processed to determine the second point on the perimeter of the circle. In some implementations, processing the first point (which is the center of the circle) and the first parameter (e.g., radius or diameter) value can include adding a measurement plane mask to the image of the target object, as described in FIG. 6.

At 214, the target object is characterized, by the client device or the server system, based on the parameters of the graphical object. In some implementations, characterization of the target object (e.g., an industrial machine such as, a jet engine) may include comparison of the parameters to associated threshold values. For example, characterization of the target object (e.g., an industrial machine such as, a jet engine) may include determining an edge profile of the industrial machine or a portion thereof for performing the comparison to the threshold values. The edge profile can be compared to particular predetermined criteria defining faultless surface (e.g., surface without defects) characterization. For example, the radius of the edge profile can correspond to a minimum radius value and a maximum radius value that define a structural integrity of the target object. In aviation, for example, a piece of debris passing through a jet engine can impact the edges of compressor blades causing damage associated with an edge deformation causing the radius to be outside the control radius range. The radius assessment is typically not done until after the "blending" procedure is performed. The damage is typically assessed by its size and position on the blade to determine whether it needs to be blended. If it does, the blending is performed, then the radii of the lead in, lead out, and central portions of the blended area may be checked against minimum and/or maximum radius requirements. The caused damage can lead to stress concentrations that increases risk of formation of a crack on the blade. The crack may eventually cause a portion of the blade to break off causing increased damage. The characterization of the target object can include classification of the target object is damaged (if one or more parameters are outside the set ranges and/or thresholds) or faultless (if all parameters are within the set ranges and/or below set thresholds). In some implementations, it is determined a critical level of the defect by determining whether a detected defect is as critical, moderate, or insignificant. The classification of the critical level can be based on determining whether one or more defect parameters are above a threshold. In some implementations, if any of the defect parameters is above a respective first threshold, the defect is identified as critical. The respective defect parameter threshold can depend on a type of material composing the imaging target, on a type of asset defining the imaging target and on a critical level associated with the imaging target. For example, a defect parameter threshold of a peripheral industrial asset can be higher than a defect parameter threshold of a node industrial asset, the functionality of which enables the functionality of other industrial asset(s). In some implementations, if multiple defect parameters are above respective second thresholds, the defect is identified as critical. For example, if material change (loss or gain) of a detected percentage is above a respective second threshold along a dimension exceeding a second dimension threshold, the defect is identified as critical. As another example, if the variation (change over time) of any of the defect parameters exceeds a change rate threshold, indicating an increase in defect severity, a defect previously categorized for monitoring class, can be reassigned to a critical class. In some implementations, the classification of defects can be performed by a learning model trained on a set of images and user input to confirm and/or adjust classification.

At 216, in response to determining that the target object is damaged, an operation can be selected, by the client device or the server system, to be performed by a repairing device. The operation can be selected based on the characterization and a repairing plan identified as matching the determined characterization, compatible with the target object. In the example of the damaged blade of a jet engine, the repairing device can include a grinding tool that can be inserted to grind away the damaged area creating a smooth edge profile that can reduce the stress concentration (e.g., referred to as "boro-blending"). In some cases, the engine manufacturer may specify the minimum allowed radius along the blended blade edge in order to ensure that the stress concentration is below an acceptable limit. Existing borescopes do not provide a practical way of determining whether a repaired (blended) blade meets the radius requirements. In some implementations, determination of acceptability of a blended blade edge can be made based on comparison of the edge profile of the blended blade with a graphical object (e.g., a circle, an oval, etc.), by repeating at least a portion of the example process 200. For example, a graphical object can be generated (e.g., generated by steps 202-108) and overlaid on an image of the blade (e.g., 2D image of the blade). The graphical object may be an oval in the 2D image that can be mapped to a circle in the 3D representation of the blade. The graphical object can be moved over the image of the blade (e.g., by clicking and dragging). In some implementations, the perimeter of the graphical object can be placed on the blended blade edge and the curvature of the graphical object perimeter can be compared to the curvature of the blended blade edge. For example, a perimeter location in the perimeter of the graphical object can be placed on a location on the blended edge (e.g., the location from which the blend in the blade begins). In some implementations, the radius of the graphical object (or the projection of the graphical object in the 3D representation) can be determined based on the depth of the blend in the blade (e.g., can be a predetermined multiple determined by a multiplier value of the depth, as described in FIG. 14). In some implementations, if the curvature of the blended blade edge is less than the curvature of the graphical object perimeter, the blended blade may be considered unsuitable for operation. In some implementations, multiple graphical objects can be generated in the graphical user interface. For example, a first graphical object with a center located over the blade can be generated, and a second graphical object with a center not located over the blade can be generated. Examples of representations of graphical objects are provided with reference to FIGS. 3-14.

Figure 3B:
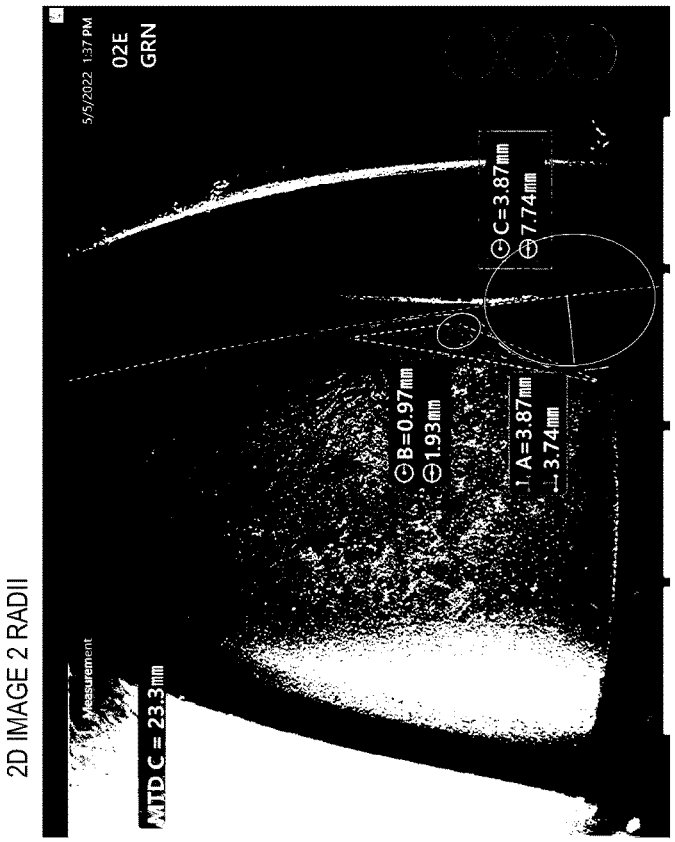
FIGS. 3-12 illustrates example graphical user interfaces (GUIs) including visual representations of an imaging target, in accordance with embodiments presented herein.
Figure 3A:
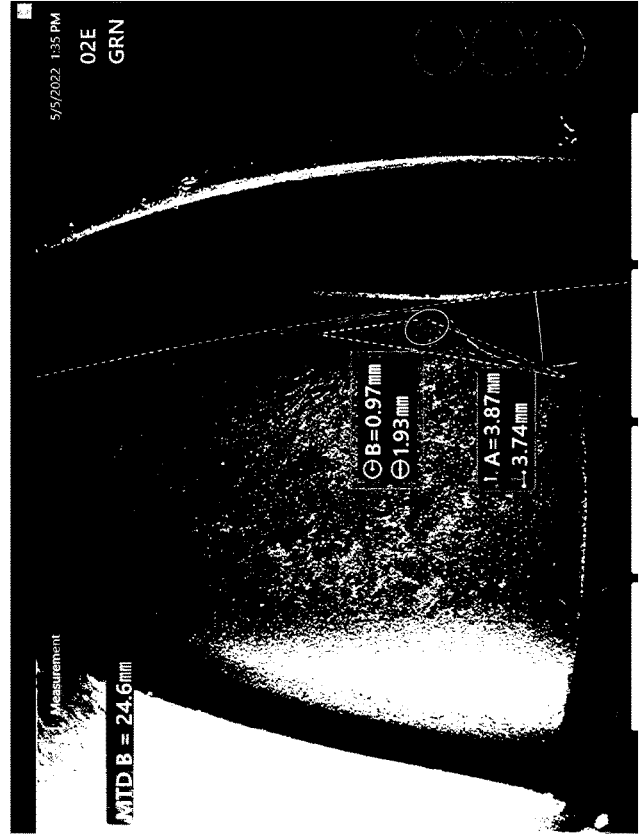

FIGS. 3A and 3B illustrate an example representations of at least one graphical object overlaid on a 2D image of a blade, including a measurement plane. FIG. 3A illustrates an example representation of a graphical object overlaid on a 2D image of a blade. The center of the graphical object is located over the blade. FIG. 3B illustrates an example representation of two graphical objects overlaid on a 2D image of a blade. The center of the first graphical object is located over the blade, while the center of the second graphical object is not located over the blade. The two graphical objects have different radii.

Figure 4:
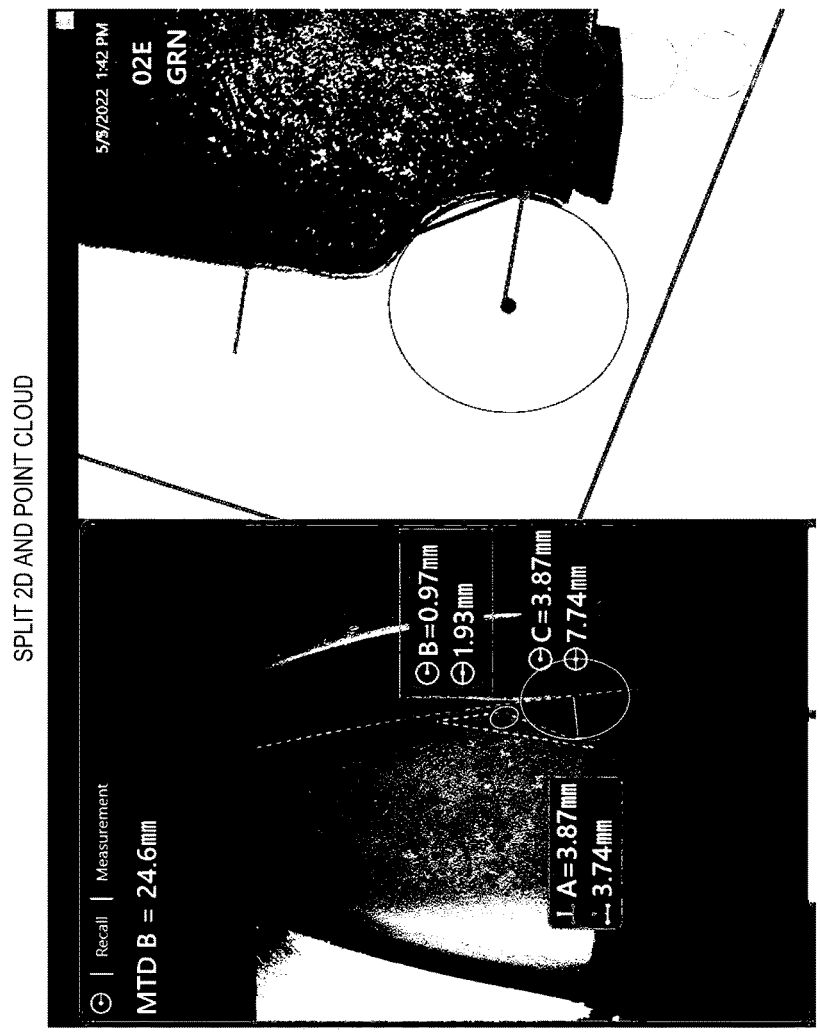
Figure 5:
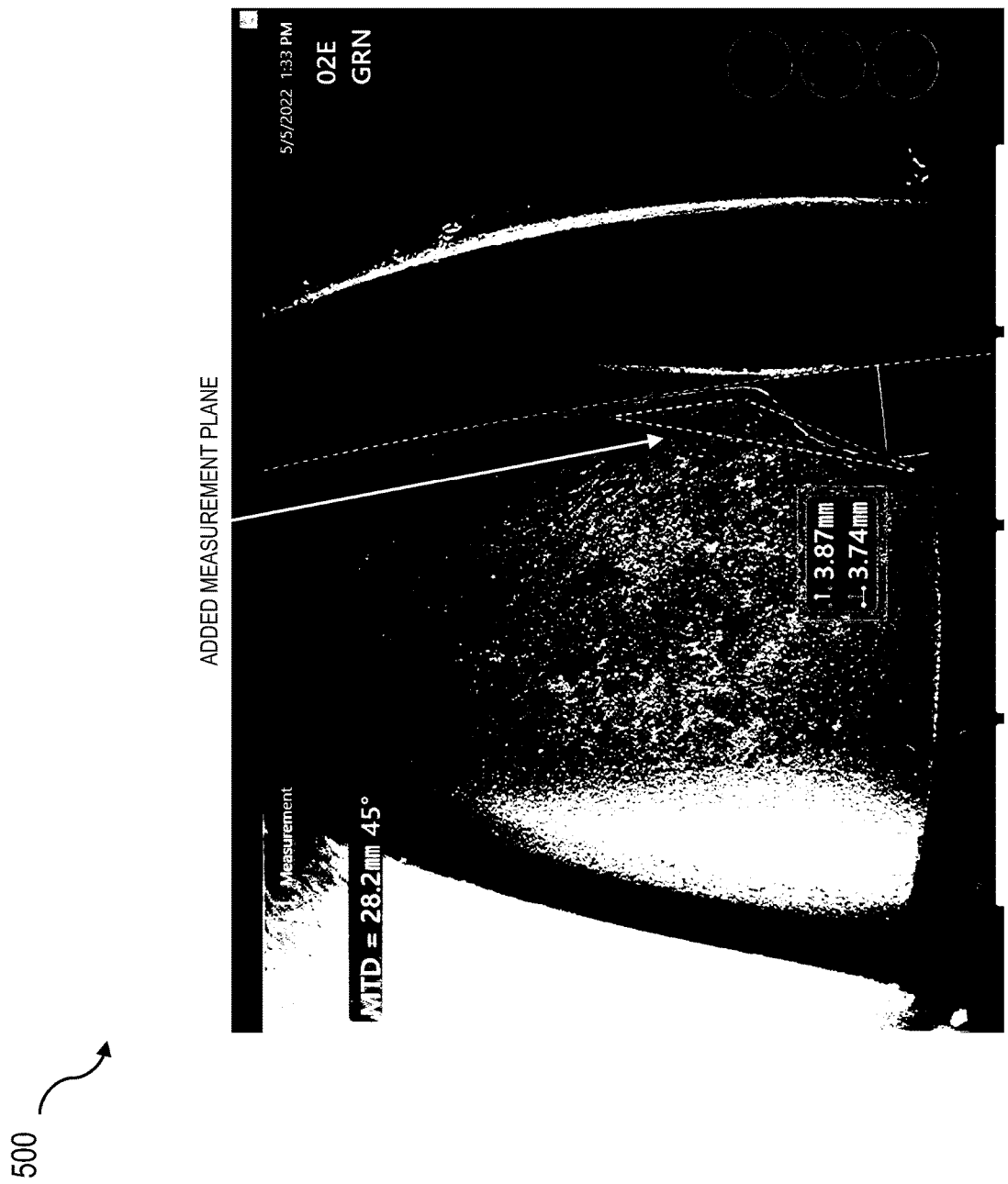
Figure 6:
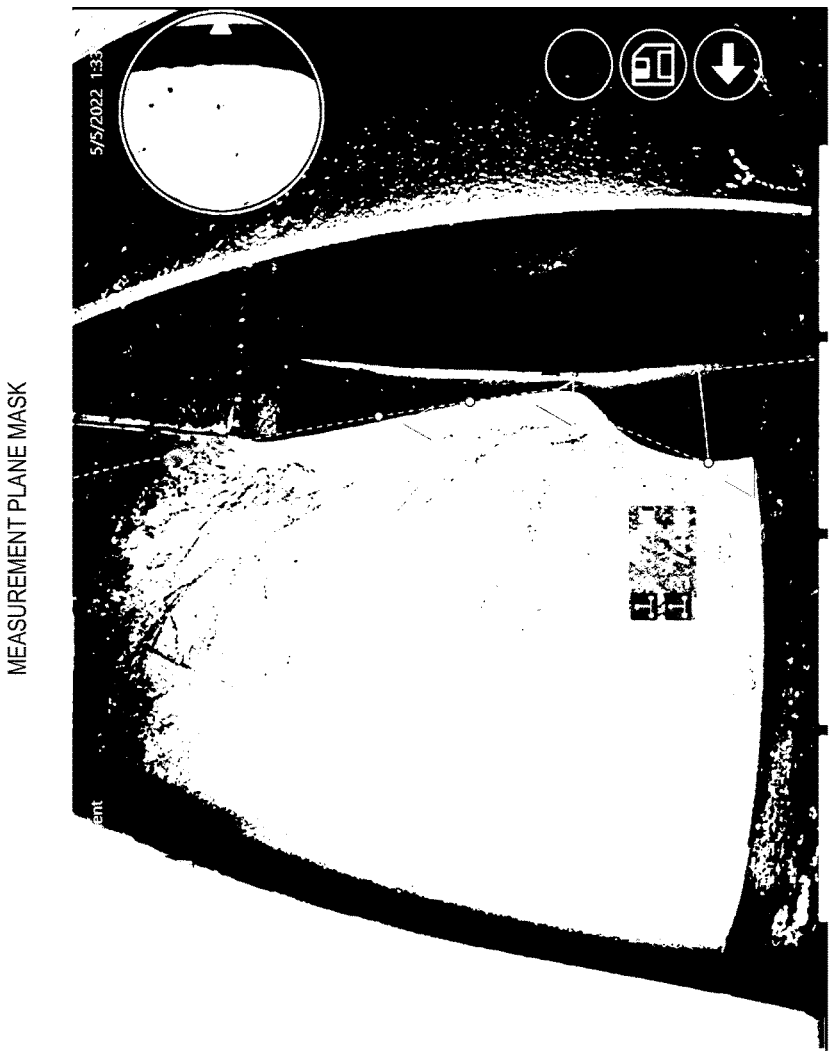
Figure 7:
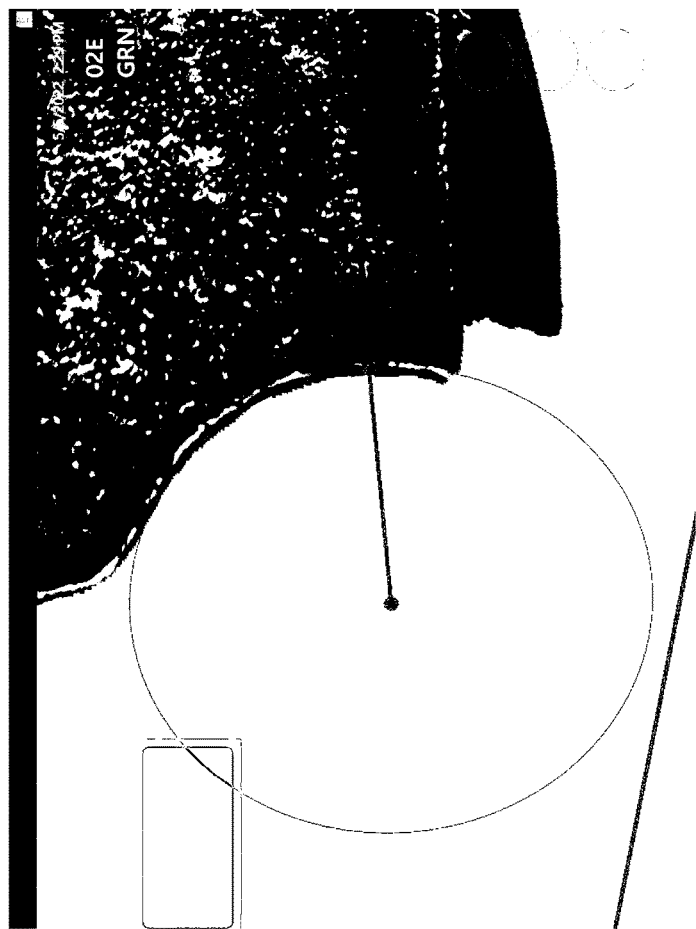
Figure 8:
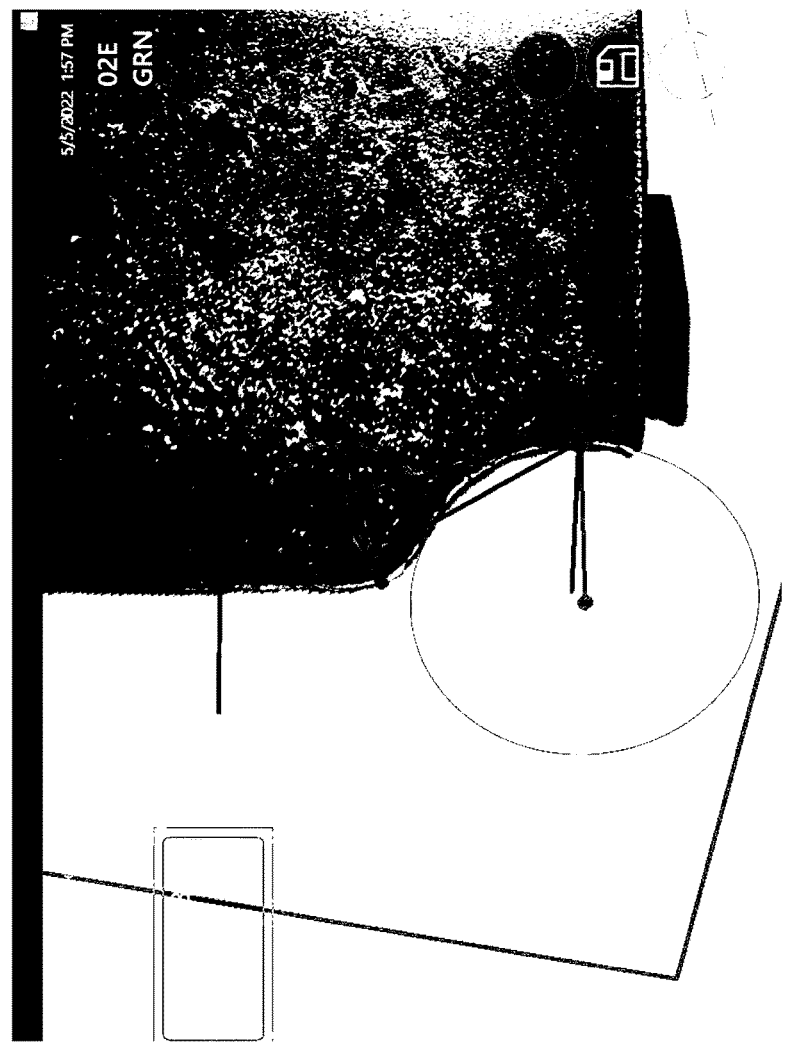
Figure 9:
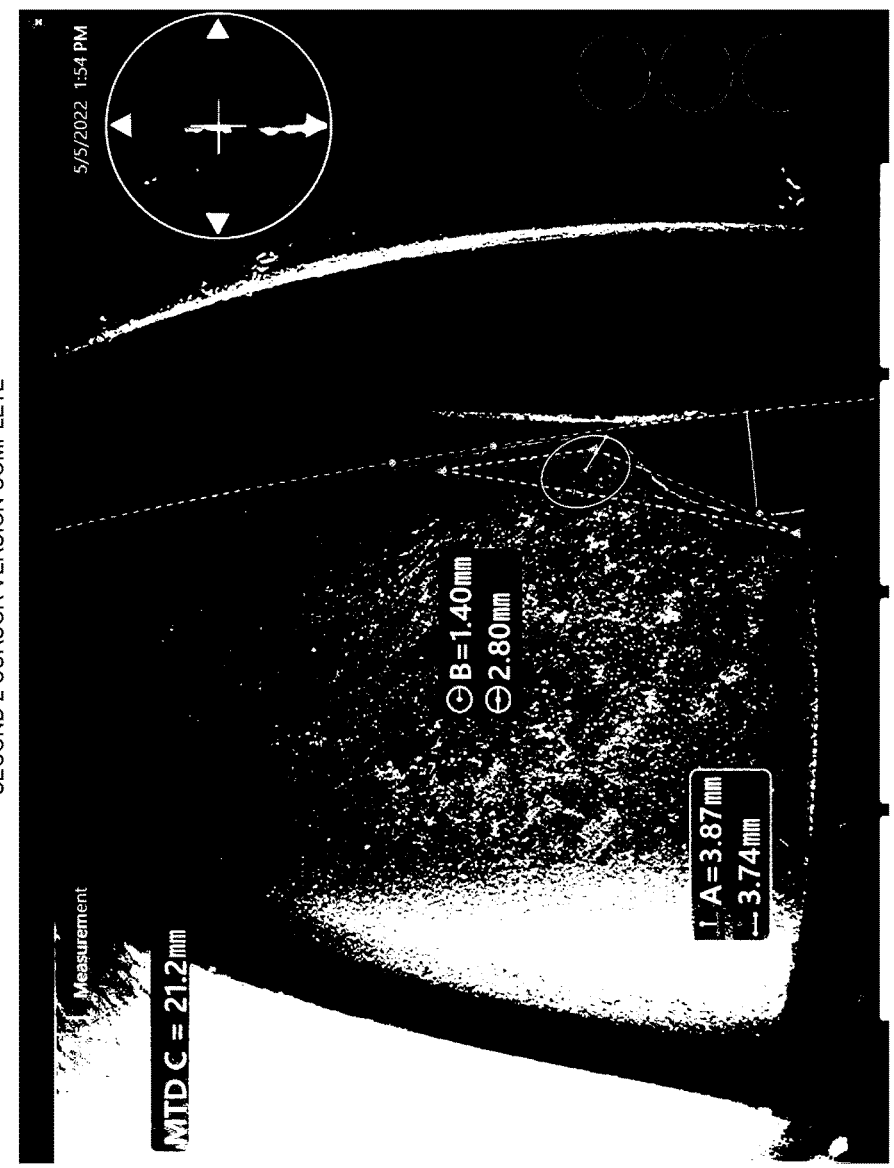
Figure 10:
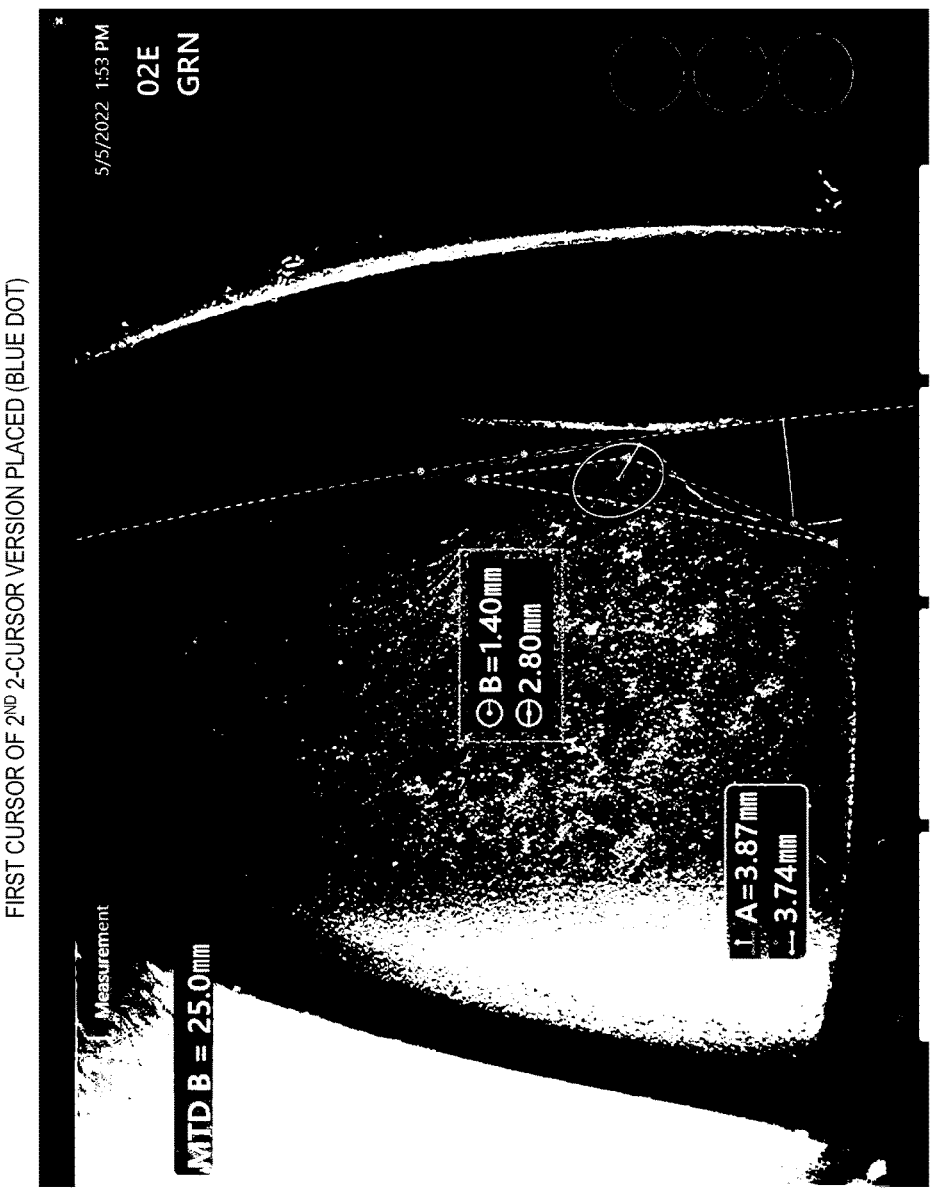
Figure 11:
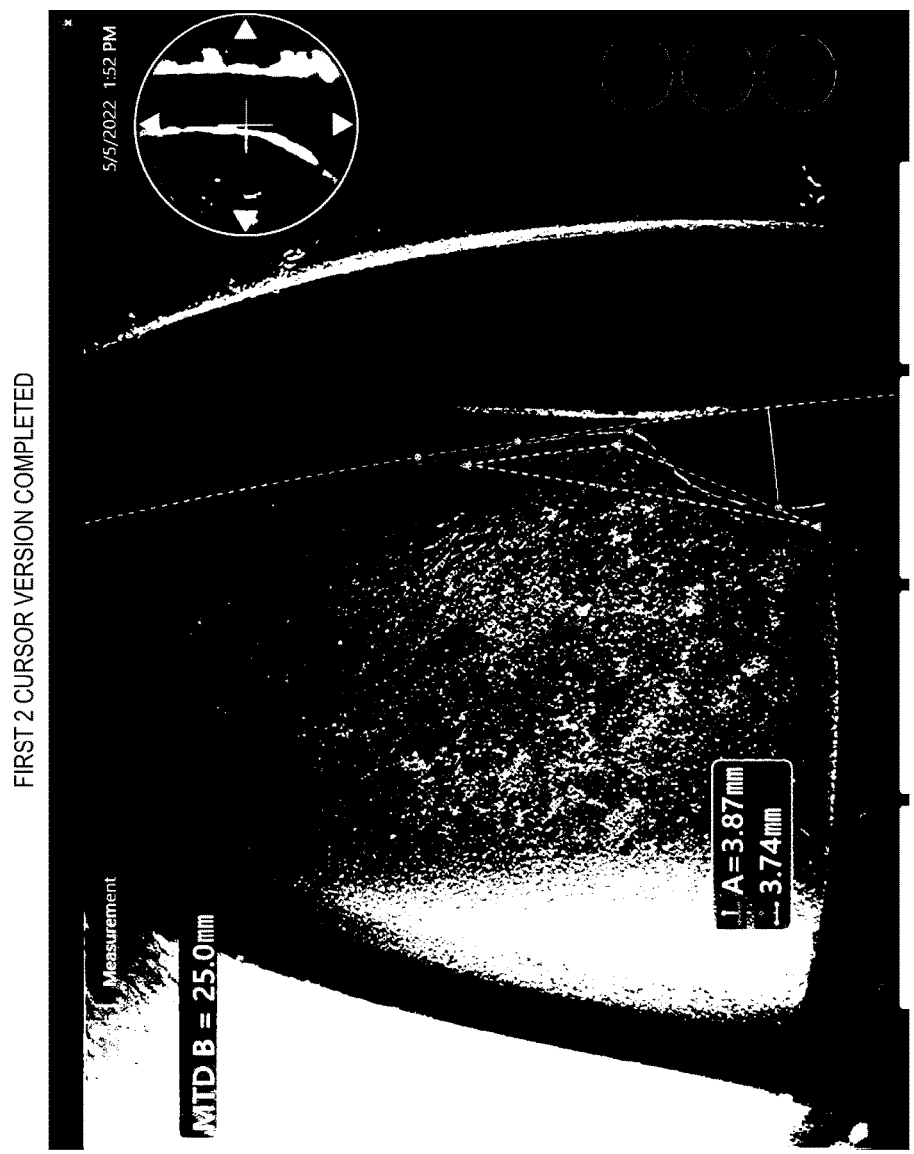
Figure 12:
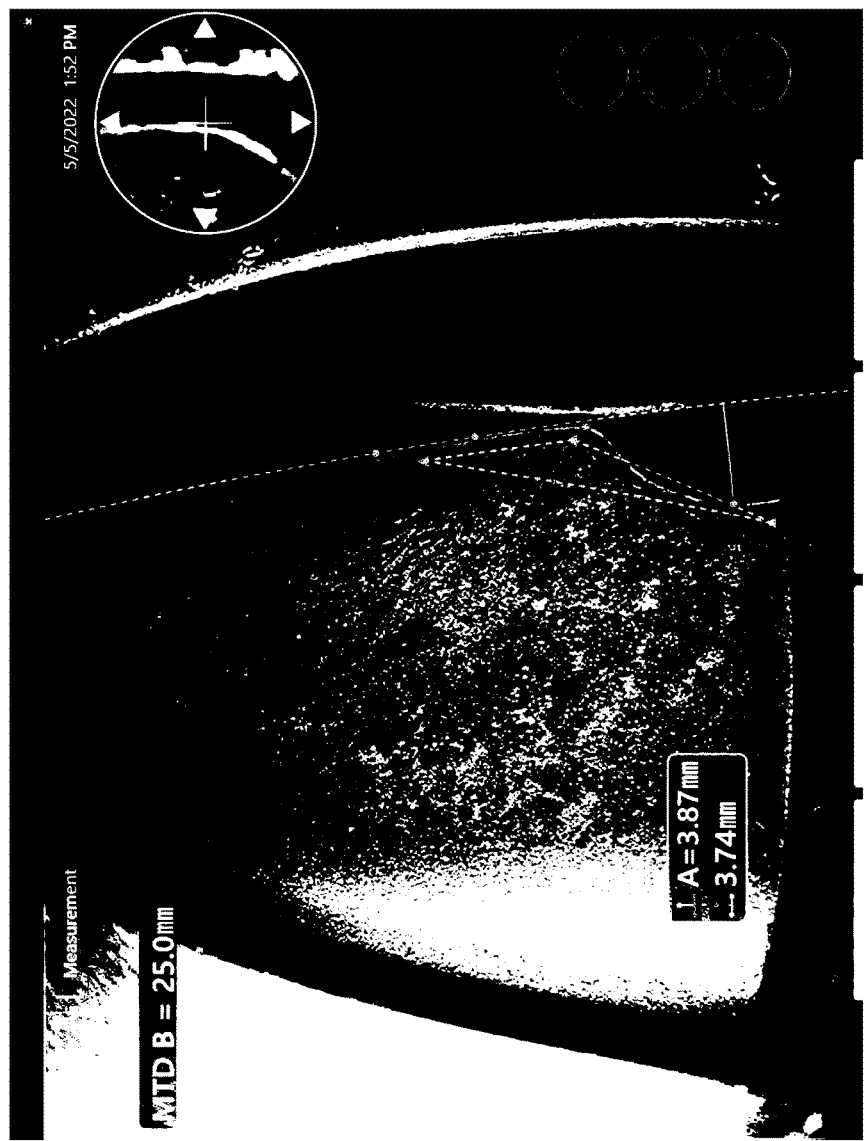

FIG. 4 illustrates an example representation that includes a 2D image and a point cloud image of the blade. FIG. 5 illustrates an example generation of a reference surface, which may be referred to as a measurement plane, by selection of three positions on the surface of the blade with an added measurement plane. FIG. 6 illustrates the portions on the surface of the blade that are within a predetermined distance from the reference plane generated in FIG. 5. FIGS. 7 and 8 illustrate example representations of point cloud image of the blade and the graphical object where the 3D circle represented by the graphical object lies on the reference surface determined using the three positions on the surface of the blade selected in FIG. 5. FIG. 9-12 illustrate example representations of 2D images of the blade with graphical objects and/or reference surface overlaid on the image of the blade.

Figure 13:
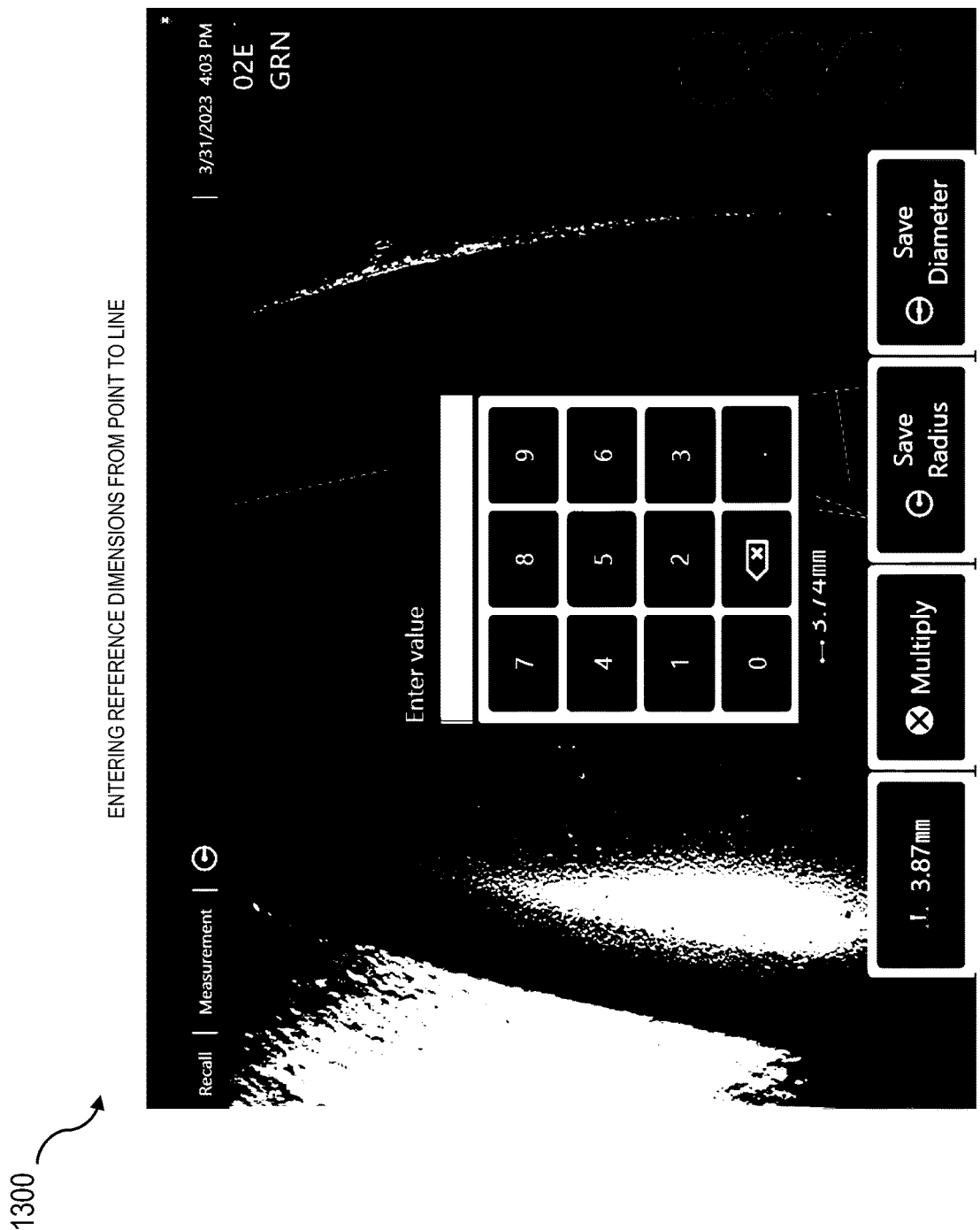
FIG. 13 illustrates an example GUI that allows for providing user input indicative of radius of the graphical object, in accordance with embodiments presented herein.
Figure 14:
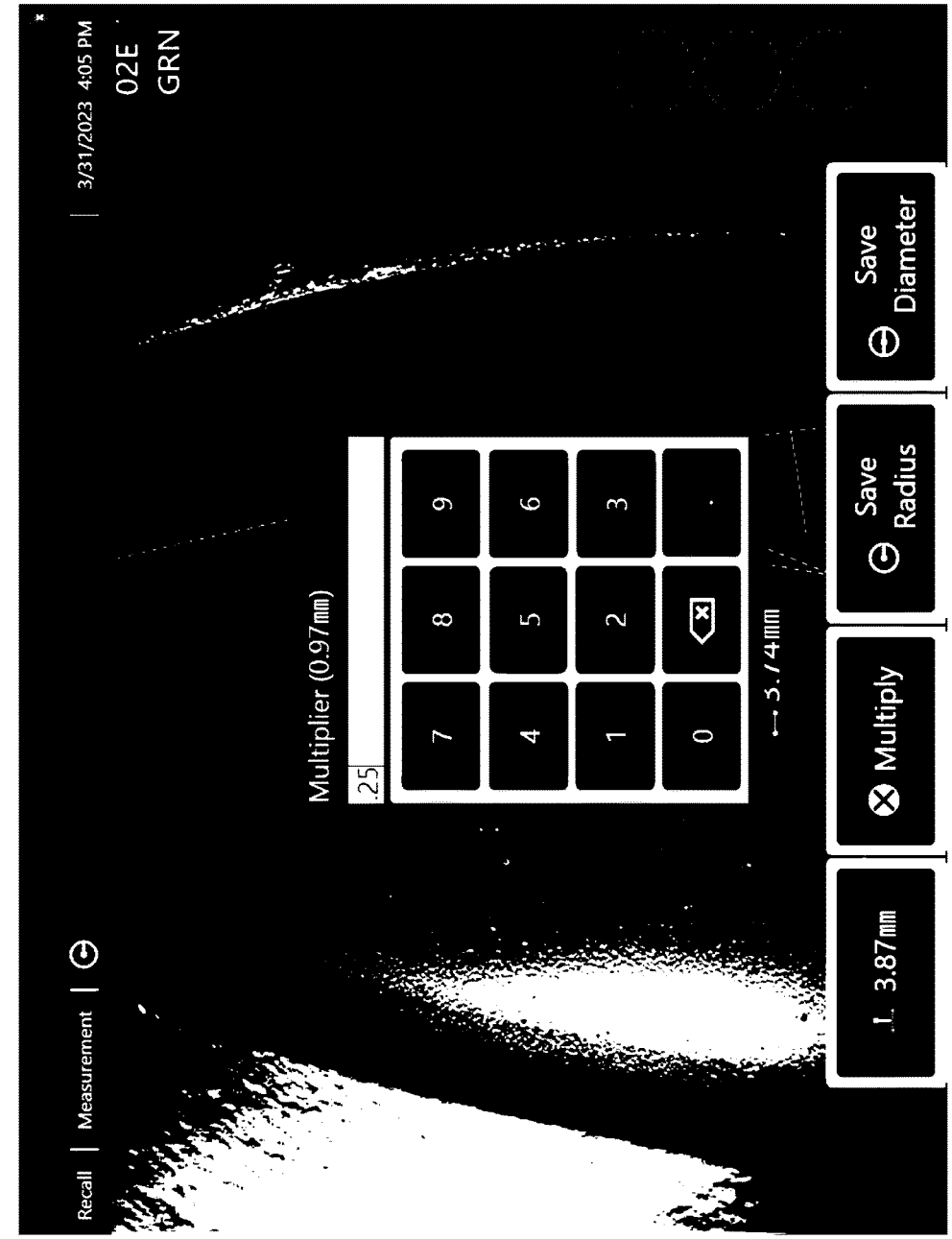
FIG. 14 illustrates an example GUI that allows for providing a user input indicative of a multiplier value that can be used to determine the radius of the graphical object, in accordance with embodiments presented herein.

FIG. 13 illustrates an example GUI that allows for providing a user input indicative of the radius of the circle represented by the graphical object. FIG. 14 illustrates an example GUI that allows for providing a user input indicative of a multiplier value that can be used to determine the radius of the circle represented by the graphical object. For example, the depth of the blend may be determined using, for example, a point-to-line measurement. The multiplier value can be multiplied by the depth of the blend in the blade to determine the radius of the circle represented by the graphical object. In some implementations, the GUI may allow for providing a user input selecting the result of an existing measurement, such as a point-to-line measurement, to be used as a factor in determining the radius of the circle represented by the graphical object.

Figure 15:
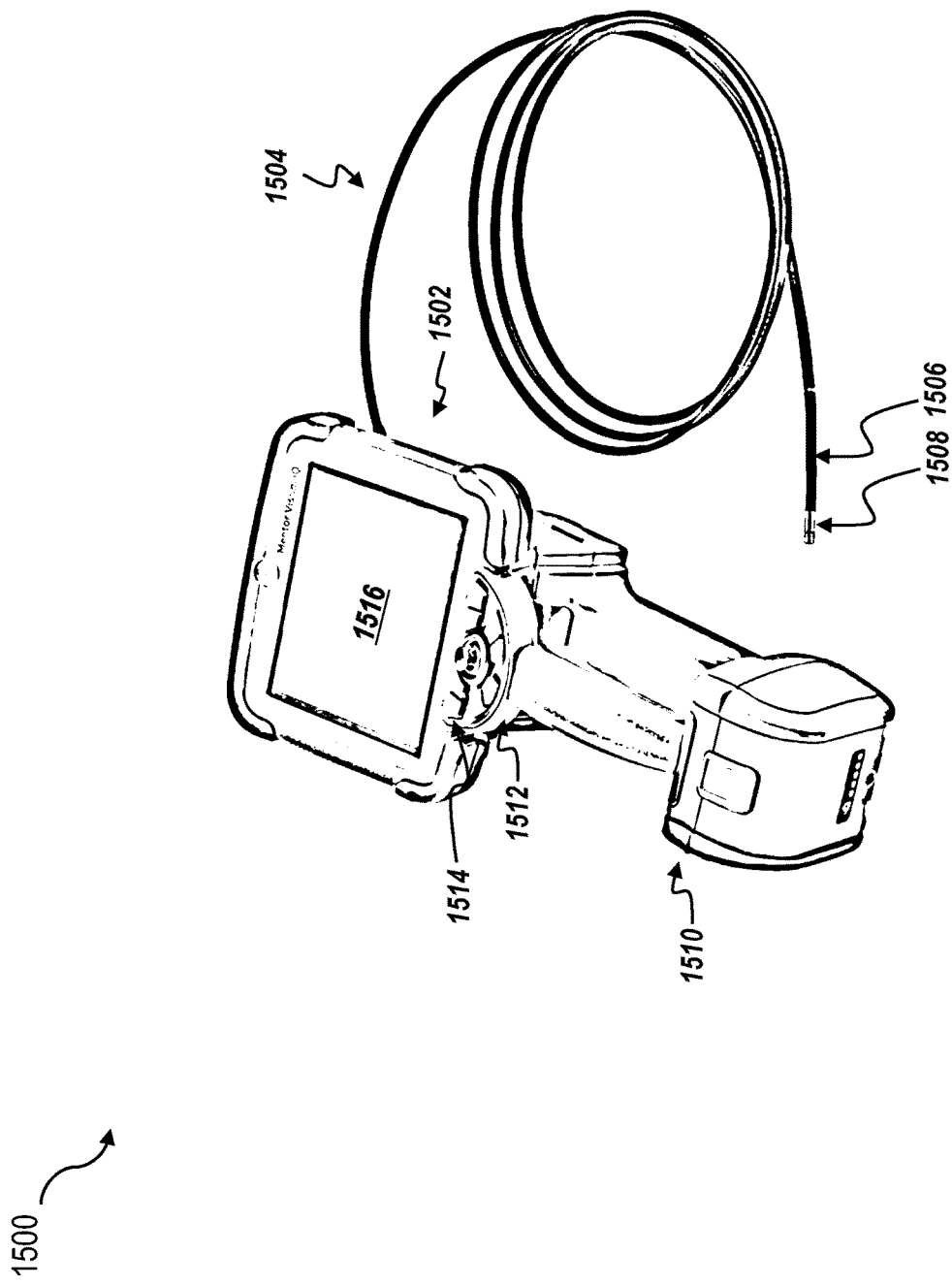
FIG. 15 illustrates an example imaging device, in accordance with embodiments presented herein.

FIG. 15 illustrates an example imaging device including a borescope 1500, in accordance with embodiments presented herein. The example borescope 1500 can include a portable device with a limited amount of memory and storage. The example borescope 1500 can be configured to capture and generate large amount of data during inspections. The data generated by the example borescope 1500 can include 2D images and/or 3D volume images with corresponding 3D data, measurements, human or computer-generated annotations and indications, menu driven inspection (MDI) metadata, and other metadata associated with the inspection, as described with reference to FIGS. 1-14. The data captured from one or more borescopes 1500 can be continuously synchronized to a remote server system (e.g., server system 102 described with reference to FIG. 1) and managed from the borescope 1500.

The borescope 1500 can include a control unit 1502 (or controller), a conduit section 1504, a bendable articulation section 1506, and a head section 1508. In one embodiment, the sections 1504, 1506, 1508 can have different lengths and can be integral with one another, or can be detachable from one another. As depicted, the conduit section 1504 can be suitable for insertion into a variety of different targets, such as inside turbomachinery, equipment, pipes, conduits, underwater locations, curves, bends, inside or outside of an aircraft system, and the like. The borescope 1500 can include a probe driver coupled to the conduit section 1504. The probe drivercan include a motor (not shown) configured to translate and/or rotate one or more of the sections 1504, 1506, 1508 (e.g., to facilitate insertion of the probe head 1508 into the imaging target). Additionally or alternatively, orientation/position of a portion of the head section 1508 (e.g., camera, light source, etc.) can be varied to acquire an inspection region image (e.g., RGB image, IR image, etc.). The control unit 1502 can include a control unit housing 1510, a controller 1512, a directional input 1514, and a screen 1516. The controller 1512 can include a processor and a readable memory containing computer readable instructions which can be executed by the processor in order to actuate the borescope 1500. The computer readable instructions can include an inspection plan based on which the borescope 1500 or a portion thereof (e.g., a conduit section 1504, a bendable articulation section 1506, and a head section 1508) can be translated/rotated (e.g., by the probe driver). In some implementations, the operation of the probe driver can be based on a control signal (e.g., generated by the controller based on the inspection plan/user input via GUI display space on screen 1516 or a computing device, etc.).

The controller 1512 can be communicatively coupled to the control unit 1502 via one or more signals. The controller 1512 can also be arranged within the control unit housing 1510, or can be arranged outside the control unit housing 1510. On some implementations, the directional input 1514 can be configured to receive user input (e.g., direction controls) to the control unit 1502 for actuation of the borescope 1500. The screen 1516 can display visual information being received by the camera (comprising an optical sensor) arranged in the head section 1508, which can allow the user to better guide the borescope 1500 using the directional input 1514. The directional input 1514 and the screen 1516 can be communicatively coupled to the controller 1512 via the one or more signals, which can be a hard-wired connection or a wireless signal, such as WI-FI or Bluetooth. In one implementation, inspection data and/or notifications (e.g., notifications based on inspection data as described above) can be provided on the screen 1516.

The conduit section 1504 can include a tubular housing including a proximal end and a distal end. The tubular housing can be a flexible member along its whole length, or can be rigid at the proximal end and become more flexible travelling down the length of the conduit section 1504 towards the distal end. In certain embodiments, the tubular housing can be formed from a non-porous material to prevent contaminants from entering the borescope 1500 via the conduit section 1504. The control unit 1502 can be arranged at the proximal end of the tubular housing, and the bendable articulation section 1506 can be arranged at the distal end of the tubular housing. The bendable articulation section 1506 can include a bendable neck and washers. The bendable neck can be arranged at the distal end of the tubular housing, and is able to be actuated in the Y-Z plane. The bendable neck can be wrapped in a non-porous material to prevent contaminants from entering the borescope 1500 via the bendable articulation section 1506. The head section 1508 can include a head assembly. The head assembly can include one or more light source (e.g., LEDs or a fiber optic bundle with lights at the proximal end), a camera (or multiple cameras such as visible-light camera, IR camera, etc.), and one or more sensors that can be configured to collect data about the surrounding environment. The camera of the borescope 1500 can provide images and video suitable for inspection to the screen 1516 of the control unit 1502. The light source can be used to provide for illumination when the head section 1508 is disposed in locations having low light or no light. The sensor can record data including temperature data, distance data, clearance data (e.g., distance between a rotating element and a stationary element), flow data, and so on. During use, the bendable articulation section 1506 and the probe driver can be controlled, for example, by the control inputs (e.g., relative control gestures, physical manipulation device) from the directional input 1514 and/or control signals generated by the controller 1512. The directional input can be a joystick, D-pad, touch pad, trackball, optical sensor, or a touchscreen over the screen 1516. The directional input 1514 can also be a similar device that is located outside the control unit housing 1510 and connected by wire or wireless means. In particular, a set of control inputs can be used to control the bendable articulation section 1506 and/or the probe driver 1509. The bendable articulation section 1506 can steer or "bend" in various dimensions, while the conduit section 1504 can translate and/or rotate, using any combination of actuators and wires arranged within the control unit 1502, to adjust the orientation (e.g., a positioning) of the head section 1508. In some implementations, the control inputs/direction input 1514 can be generated by the controller based on the inspection plan.

The actuators can be electric, pneumatic, or ultrasonically operated motors or solenoids, shape alloy, electroactive polymers, dielectric elastomers, polymer muscle material, or other materials. For example, the bendable articulation section 1506 and the probe driver 1509 can enable movement of the head section 1508 in an X-Y plane, X-Z plane, and/or Y-Z plane. Indeed, the directional input 1514 can be used to perform control actions suitable for disposing the head section 1508 at a variety of angles, such as the depicted angle $\alpha$. In this manner, the head section 1508 can be positioned to visually inspect desired locations. Once the head section 1508 is in a desired position, the camera can operate to acquire, for example, a stand-still visual image or a continuous visual image, which can be displayed on the screen 1516 of the control unit 1502, and can be recorded by the borescope 1500. In embodiments, the screen 1516 can be multi-touch touch screens using capacitance techniques, resistive techniques, infrared grid techniques, and the like, to detect the touch of a stylus and/or one or more human fingers. Additionally or alternatively, acquired visual images can be transmitted into a separate storage device for later reference.

Figure 16:
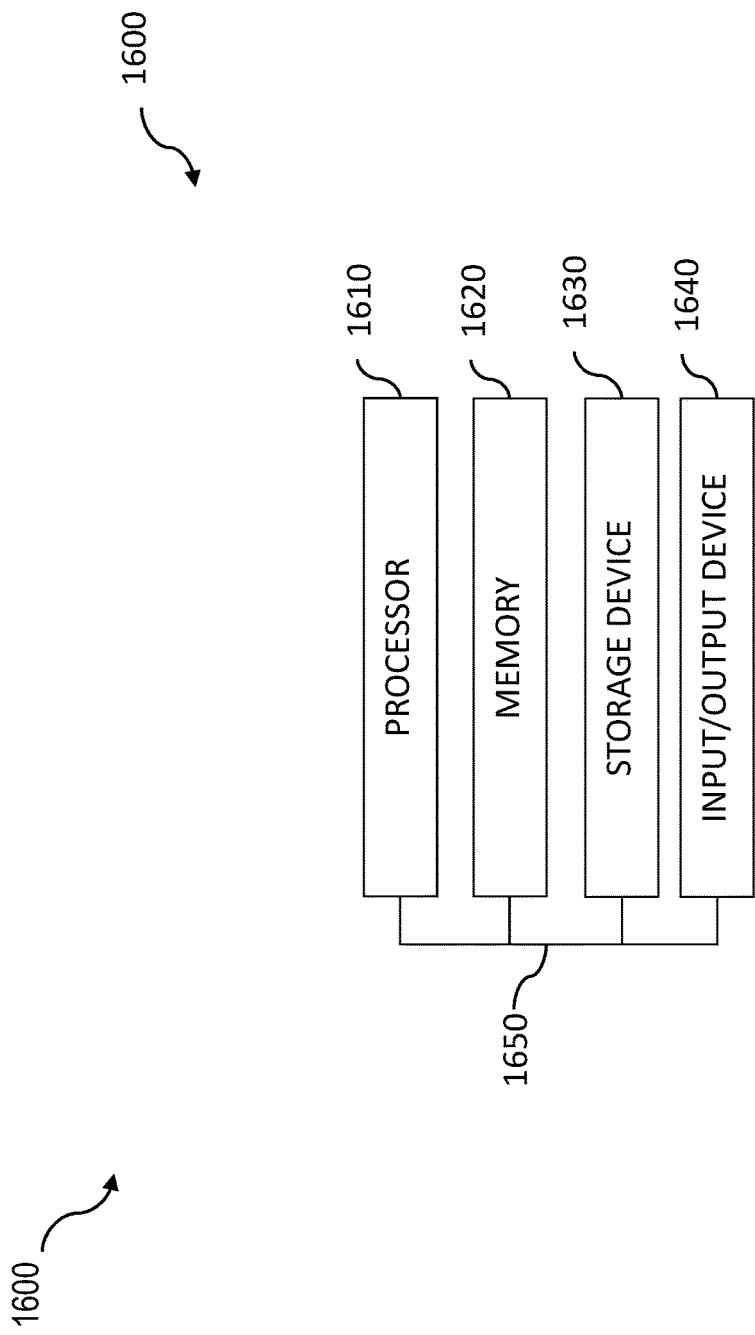
FIG. 16 depicts a block diagram illustrating an example of a computing system, in accordance with some example implementations.

As shown in FIG. 16, the computing system 1600 can include a processor 1610, a memory 1620, a storage device 1630, and input/output devices 1640. The processor 1610, the memory 1620, the storage device 1630, and the input/output devices 1640 can be interconnected via a system bus 1650. The processor 1610 is capable of processing instructions for execution within the computing system 1600. Such executed instructions can be implemented by one or more components of, for example, the server system 102 and/or the client device 104, described with reference to FIG. 1. In some example implementations, the processor 1610 can be a single-threaded processor. Alternatively, the processor 1610 can be a multi-threaded processor. The processor 1610 is capable of processing instructions stored in the memory 1620 and/or on the storage device 1630 to present graphical information for a user interface provided via the input/output device 1640.

The memory 1620 is a computer readable medium such as volatile or non-volatile that stores information within the computing system 1600. The memory 1620 can store data structures representing configuration object databases, for example. The storage device 1630 is capable of providing persistent storage for the computing system 1600. The storage device 1630 can be a floppy disk device, a hard disk device, an optical disk device, or a tape device, or other suitable persistent storage means. The input/output device 1640 provides input/output operations for the computing system 1600. In some example implementations, the input/output device 1640 includes a keyboard and/or pointing device. In various implementations, the input/output device 1640 includes a display unit for displaying graphical user interfaces.

According to some example implementations, the input/output device 1640 can provide input/output operations for a network device. For example, the input/output device 1640 can include Ethernet ports or other networking ports to communicate with one or more wired and/or wireless networks (e.g., a local area network (LAN), a wide area network (WAN), the Internet).

In some example implementations, the computing system 1600 can be used to execute various interactive computer software applications that can be used for organization, analysis and/or storage of data in various formats. Alternatively, the computing system 1600 can be specifically configured to execute software applications. These applications can perform various fullness detection functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1640. The user interface can be generated and presented to a user by the computing system 1600 (e.g., on a computer screen monitor, etc.).

One or more aspects or features of the subject matter described herein can be realized in specifically configured digital electronic circuitry, integrated circuitry, application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

As used herein a "user interface" (also referred to as an interactive user interface, a graphical user interface or a user interface or UI) may refer to a network based interface including data fields and/or other control elements for receiving input signals or providing electronic information and/or for providing information to the user in response to any received input signals. Control elements may include dials, buttons, icons, selectable areas, or other perceivable indicia presented via the UI that, when interacted with (e.g., clicked, touched, selected, etc.), initiates an exchange of data for the device presenting the UI. A UI may be implemented in whole or in part using technologies such as hyper-text mark-up language (HTML), FLASH™, JAVA™, .NET™, web services, or rich site summary (RSS). In some implementations, a UI may be included in a stand-alone client (for example, thick client, fat client) configured to communicate (e.g., send or receive data) in accordance with one or more of the aspects described. The communication may be to or from a medical device or server in communication therewith.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. "Determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the receptacle via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As user herein, the terms "correspond" or "corresponding" encompasses a structural, functional, quantitative and/or qualitative correlation or relationship between two or more objects, data sets, information and/or the like, preferably where the correspondence or relationship may be used to translate one or more of the two or more objects, data sets, information and/or the like so to appear to be the same or equal. Correspondence may be assessed using one or more of a threshold, a value range, fuzzy logic, pattern matching, a machine learning assessment model, or combinations thereof.

In some implementations, data generated or detected can be forwarded to a "remote" device or location, where "remote," means a location or device other than the location or device at which the program is executed. For example, a remote location could be another location (e.g., office, lab, etc.) in the same city, another location in a different city, another location in a different state, another location in a different country, etc. As such, when one item is indicated as being "remote" from another, what is meant is that the two items can be in the same room but separated, or at least in different rooms or different buildings, and can be at least one mile, ten miles, or at least one hundred miles apart. "Communicating" information references transmitting the data representing that information as electrical signals over a suitable communication channel (e.g., a private or public network). "Forwarding" an item refers to any means of getting that item from one location to the next, whether by physically transporting that item or otherwise (where that is possible) and includes, at least in the case of data, physically transporting a medium carrying the data or communicating the data. Examples of communicating media include radio or infra-red transmission channels as well as a network connection to another computer or networked device, and the internet or including email transmissions and information recorded on websites and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
rendering, in a graphical user interface display space, a visual representation of a target object;
receiving, based on a first user interaction with the visual representation, a first user input indicative of a selection of a first position on a surface of the target object;
receiving a second user input indicative of a first distance;
determining a measurement plane based on a selection of a plurality of positions on the surface of the target object, wherein the measurement plane extends beyond bounds of the target object;
determining a plurality of three dimensional perimeter points on the measurement plane based on the first position and the first distance; and
rendering, based on the determined plurality of three dimensional perimeter points, in the graphical user interface, a graphical object overlaying the visual representation of the target object, wherein a location of the graphical object in the graphical user interface is based on the measurement plane.

2. The method of claim 1, wherein the plurality of positions are selected based on the first position and the first distance.

3. The method of claim 1, wherein the visual representation comprises a two-dimensional image of the target object.

4. The method of claim 1, wherein the target object comprises an industrial device.

5. The method of claim 1, further comprising characterizing the target object based on the graphical object and a specified threshold value.

6. The method of claim 5, wherein characterizing the target object comprises classifying a defect of the target object.

7. The method of claim 5, wherein characterizing the target object comprises visually comparing a profile of the target object to the graphical object.

8. The method of claim 1 further comprising:
receiving data, from a borescope, characterizing a plurality of images of the target object; and
determining a three-dimensional representation of the target object, the three-dimensional representation comprises a plurality of points on the surface of the target object, wherein the visual representation of the target object is based on the plurality of images of the target object and/or the three-dimensional representation of the target object.

9. The method of claim 8, wherein the plurality of images are stereoscopic images of the target object.

10. The method of claim 8, wherein the visual representation comprises a three-dimensional representation of the target object.

11. The method of claim 10, wherein the plurality of positions map to a plurality of points in a three-dimensional coordinate system of the three-dimensional representation, wherein each position of the plurality of positions corresponds to a particular three-dimensional point.

12. The method of claim 11, wherein the graphical object maps to a circle in the three-dimensional coordinate system, and wherein the first distance is indicative of a radius of the circle.

13. The method of claim 12, wherein the circle is located on the measurement plane.

14. The method of claim 11, wherein the graphical object further comprises an oval in the visual representation of the target object.

15. The method of claim 1, wherein the plurality of positions comprises three positions.

16. A system comprising:
at least one data processor; and
a non-transitory memory coupled to the at least one data processor, the non-transitory memory storing instructions to cause the at least one data processor to perform operations comprising:
rendering, in a graphical user interface display space, a visual representation of a target object;
receiving, based on a first user interaction with the visual representation, a first user input indicative of a selection of a first position on a surface of the target object;
receiving a second user input indicative of a first distance;
determining a measurement plane based on a selection of a plurality of positions on the surface of the target object, wherein the measurement plane extends beyond bounds of the target object;
determining a plurality of three dimensional perimeter points on the measurement plane based on the first position and the first distance; and
rendering, based on the determined plurality of three dimensional perimeter points, in the graphical user interface, a graphical object overlaying the visual representation of the target object, wherein a location of the graphical object in the graphical user interface is based on the measurement plane.

17. The system of claim 16, wherein the instructions cause the at least one processor to perform operations further comprising:
receiving data, from a borescope, characterizing a plurality of images of the target object; and
determining a three-dimensional representation of the target object, the three-dimensional representation comprises a plurality of points on the surface of the target object, wherein the visual representation of the target object is based on the plurality of images of the target object and/or the three-dimensional representation of the target object.

18. The system of claim 16, wherein the instructions cause the at least one processor to perform operations further comprising:
receiving data, from a borescope, characterizing a plurality of images of the target object; and
determining a three-dimensional representation of the target object, the three-dimensional representation comprises a plurality of points on the surface of the target object, wherein the visual representation of the target object is based on the plurality of images of the target object and/or the three-dimensional representation of the target object.

19. The system of claim 16, wherein the plurality of images are stereoscopic images of the target object.

20. The system of claim 16, wherein the visual representation comprises a three-dimensional representation of the target object.

21. The system of claim 20, wherein the plurality of positions map to a plurality of points in a three-dimensional coordinate system of the three-dimensional representation, wherein each position of the plurality of positions corresponds to a particular three-dimensional point.

22. The system of claim 21, wherein the graphical object maps to a circle in the three-dimensional coordinate system, and wherein the first distance is indicative of a radius of the circle.

23. A computer program product comprising a non-transitory machine-readable medium storing instructions that, when executed by at least one programmable processor, cause the at least one programmable processor to perform operations comprising:
rendering, in a graphical user interface display space, a visual representation of a target object;
receiving, based on a first user interaction with the visual representation, a first user input indicative of a selection of a first position on a surface of the target object;
receiving a second user input indicative of a first distance;
determining a measurement plane based on a selection of a plurality of positions on the surface of the target object, wherein the measurement plane extends beyond bounds of the target object;
determining a plurality of three dimensional perimeter points on the measurement plane based on the first position and the first distance; and rendering, based on the determined plurality of three dimensional perimeter points, in the graphical user interface, a graphical object overlaying the visual representation of the target object, wherein a location of the graphical object in the graphical user interface is based on the measurement plane.

* * * * *